United States Patent Office 3,410,135
Patented Nov. 12, 1968

3,410,135
FORCE OR PRESSURE MEASURING APPARATUS
Jean Gilbert André Reynaud, Courbevoie, France, assignor to Societe de Fabrication d'Instruments de Mesure (S.F.I.M.), Massy, France, a company of France
Filed Mar. 17, 1966, Ser. No. 535,232
Claims priority, application France, Mar. 22, 1965, 10,242; July 23, 1965, 25,824
3 Claims. (Cl. 73—141)

ABSTRACT OF THE DISCLOSURE

A force of pressure measuring device has a detection instrument and a pickup to indicate the detected force or pressure. The detection device is a chamber holding an elastomer which elastomer is compressed by the force or pressure but cannot escape from the chamber and the pickup receives the pressure transmitted by the elastomer.

---

This invention relates to a force or pressure measuring apparatus comprising a detection device and a pick-up to indicate the detected force or pressure. Force measuring apparatus is known which makes use of hydraulic detection devices. These have various disadvantages, more particularly because of the dangers of leakage of the hydraulic circuits, and to overcome this special precautions are necessary which increase the cost of the apparatus.

The invention obviates these disadvantages and is characterised in that the detection device consists of a chamber containing an elastomer, such elastomer being compressed in the chamber without any possibility of leakage, the pick-up receiving the pressure transmitted by the elastomer.

The invention will now be described in greater detail with reference to specific embodiments given by way of example and illustrated in the accompanying drawings, wherein.

Figure 1:
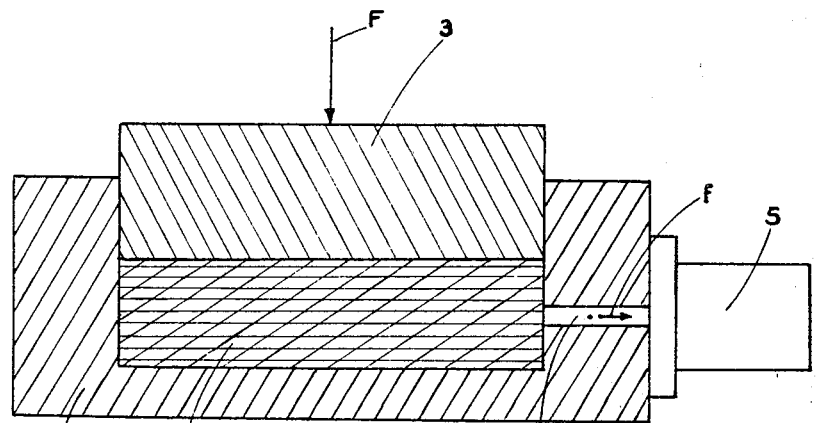
FIGURE 1 is a sectional view of a force measuring apparatus.

The apparatus shown in FIGURE 1 comprises a chamber 1 containing an elastomer block 2 which is compressed by a piston 3 subject to the action of a force F. One wall of the chamber 1 is formed with an aperture in which a small piston 4 moves to transmit a force $f$ to a force pick-up 5, the latter being of conventional type if desired. The elastomer block 2 completely fills the chamber between the pistons 3 and 4 and under the effect of the force F the elastomer behaves as a hydraulic fluid. Consequently, as in the case of a hydraulic transmission, the ratio of the forces $f/F$ is equal to the ratio $s/S$, S being the section of the piston 3 and $s$ the section of the piston 4.

The above-described apparatus transmits the pressures without any risk of leakage of the transmitting fluid which in this case consists of an elastomer, for example rubber.

Figure 2:
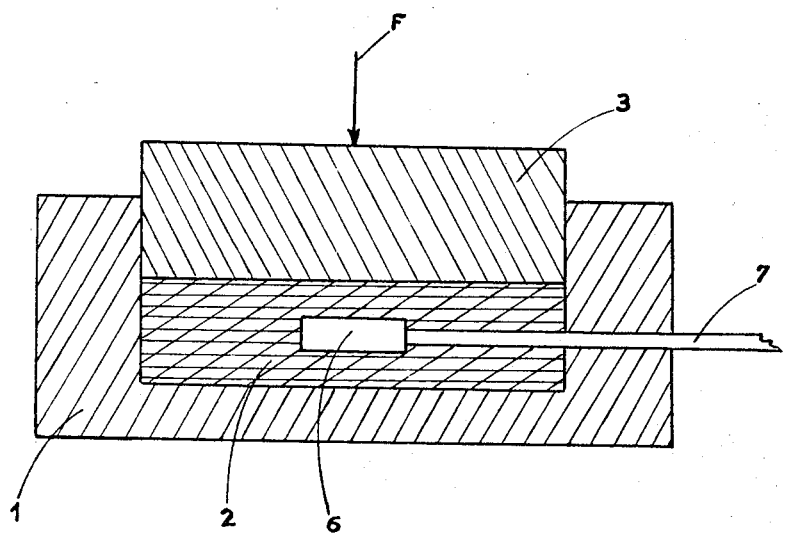
FIGURE 2 is a similar view to FIGURE 1 showing a variant embodiment.

FIGURE 2 shows a variant embodiment similar to the embodiment shown in FIGURE 1, but in this case there is no small piston 4 passing through a wall of the chamber 1, and instead the pressure pick-up 6 is simply embedded inside the elastomer 2. The pick-up directly measures the pressure to which the elastomer is subjected. The pick-up is connected to an external indicator via lines 7.

Figure 3:
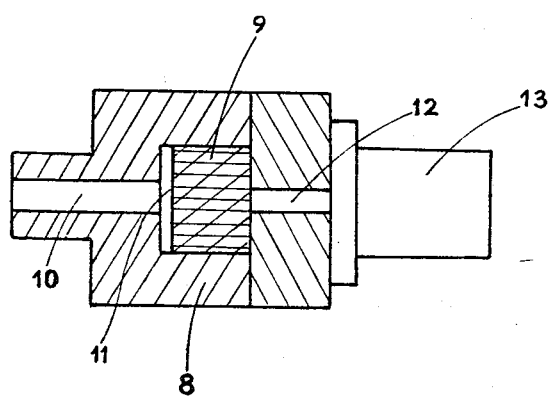
FIGURE 3 is a section of an apparatus according to the invention for measuring the pressure of a fluid.

FIGURE 3 shows another variant embodiment for measurement of the pressure of a fluid. The apparatus comprises a chamber 8 containing an elastomer block 9. The chamber 8 receives a pressure fluid via conduit 10, the pressure of the fluid acting on the surface 11 of the elastomer and compressing the same. The pressure is transmitted by a small piston 12 to a pick-up 13 as in the embodiment shown in FIGURE 1. In this embodiment the elastomer 9 transmits the pressure and acts as a seal between the pick-up 13 and the fluid arriving via conduit 10.

Figure 4:
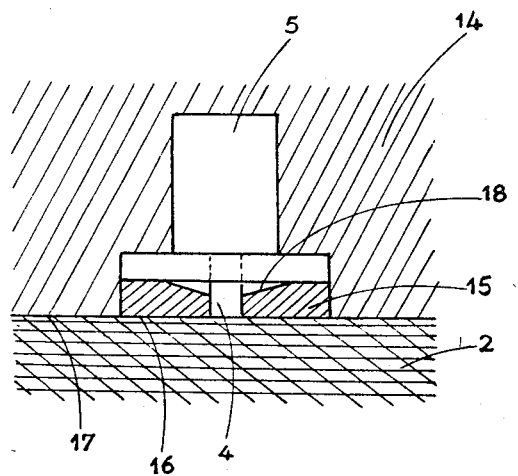
FIGURE 4 is a section of part of the chamber containing the elastomer at the place where the pressure pick-up is situated, according to a variant embodiment.

FIGURE 4 shows a wall 14 of the chamber containing an elastomer 2. A force measuring pick-up 5 is disposed in the wall 14. The pressure is transmitted from the elastomer 2 to the pick-up 5 via a small piston 4. The wall 14 contains a chamber through which the small piston 4 extends, and according to the invention a washer 15 is provided in this chamber. The washer 15 is so disposed that its surface 16 forms the missing part of the wall 17 as a result of the chamber containing the washer 15 and having the piston 4 extending through it.

The washer 15 has a recess 18 on the side adjacent the end of the chamber and this recess enables the central part of the washer to be pushed in at the same time as the piston 4. When the pressure rises in the elastomer 2, the deflection of the washer 15 is equal to the amount by which the small piston 4 is displaced. The washer 15 may be of steel so as to withstand high pressures while remaining sufficiently resilient for the washer to follow the movements of the small piston 4. With this arrangement, the elastomer 2 always acts on a surface formed by the portion 17 of the wall 14, the surface 16 of the washer 15, and the end of the small piston 4, such surface having no steps in which the elastomer would be imperfectly housed, and erosion of the elastomer by the edge of the aperture in the washer allowing the passage of the piston is thus avoided. By means of the invention the elastomer acts on a surface which has practically no gaps. In addition, this arrangement eliminates any risk of friction between the small piston 4 and the washer 15.

Figure 5:
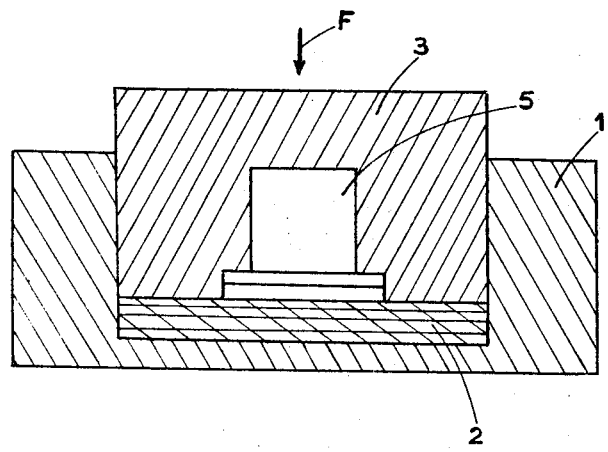
FIGURE 5 is a general diagrammatic section of the force measuring apparatus.

FIGURE 5 shows another feature of the invention where the chamber consists of a cylinder 1 in which a large piston 3 is movable under the action of a force extending in the direction of arrow F.

According to one feature of the present invention, the pick-up 5 is situated in the wall of the piston 3 and preferably on the centre-line of said piston. With this arrangement the elastomer pressures are satisfactorily transmitted without any friction between the elastomer 2 and the walls of the cylinder 1.

Figure 6:
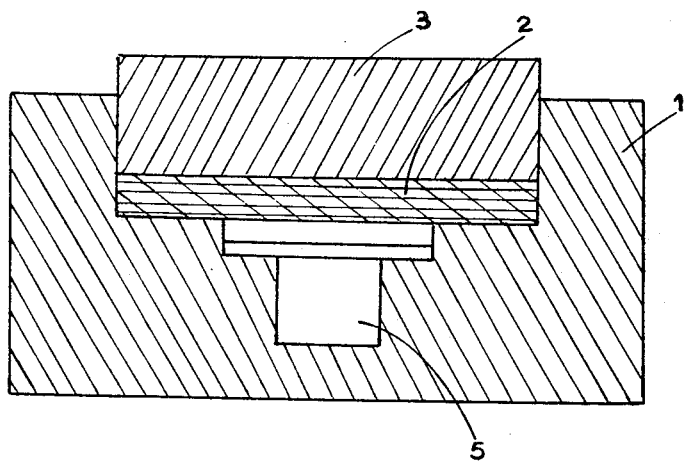
FIGURE 6 is a similar section to FIGURE 5 of another variant embodiment.

FIGURE 6 shows a variant embodiment wherein the pick-up 5 is disposed in the wall forming the end of the cylinder 1 and preferably along the axis of the said end. As in FIGURE 5, the pressures of the elastomer 2 are transmitted to the pick-up 5 through the agency possibly of a small piston similar to the piston 4 without any friction on the walls of the cylinder.

Figure 7:
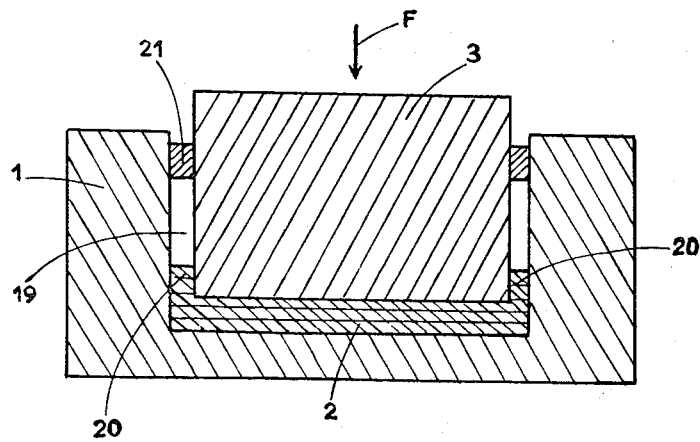
FIGURE 7 is a similar section to FIGURE 5 of yet another variant embodiment, the pick-up having been omitted for the sake of clarity.

FIGURE 7 shows another feature of the invention, in which the large piston 3 closing the chamber containing the elastomer 2 is of a smaller section than the inside of the cylinder 1. An annular space 19 is thus formed around the large piston 3. The elastomer 2 has a lip 20 engaging in said annular space 19 to centre the piston 3 in the cylinder 1. Of course the annular space 19 is small enough for there to be practically no leakage of elastomer 2 when the pressure F is applied to the large piston 3. This arrangement does away with friction between the large piston 3 and the cylinder 1 while allowing the large piston to assume an oblique position with respect to the cylinder. In addition, a resilient washer 21 may be provided in the annular space between the piston 3 and the cylinder 1 to limit the oblique position of the piston.

What I claim is:

1. Pressure and force measuring apparatus comprising a detector and a pick-up indicating the detected force, said detector including an enclosure, an elastomer entirely enclosed in said enclosure, said enclosure forming a cylinder, a piston in said cylinder compressing said elastomer without escape of said elastomer, a chamber in said enclosure, a washer closing said chamber, a piston slidably mounted in said washer transmitting the pressure from said elastomer to said pick-up and a recess in said washer facing the bottom of said chamber whereby said washer is deformed upon increase of pressure from said elastomer.

2. Apparatus as described in claim 1, said washer being steel.

3. Apparatus as described in claim 1, said washer having a face coextensive with the surface of said enclosure.

References Cited

UNITED STATES PATENTS

| | | | |
|---|---|---|---|
| 1,994,388 | 3/1935 | Erichsen | 73—141 |
| 2,909,928 | 10/1959 | Strehlow | 73—419 XR |
| 3,269,174 | 8/1966 | Linville | 73—141 XR |
| 3,277,718 | 10/1966 | Ruge | 73—141 XR |

RICHARD C. QUEISSER, *Primary Examiner.*

CHARLES A. RUEHL, *Assistant Examiner.*